United States Patent [19]

Slivka

[11] Patent Number: 5,124,528

[45] Date of Patent: Jun. 23, 1992

[54] GAS TUNGSTEN AND PLASMA ARC WELDING ELECTRODE HAVING A CARBIDE EMITTER END

[76] Inventor: William R. Slivka, 3172 Overbrook Dr., Port St. Lucie, Fla. 34852

[21] Appl. No.: 634,003

[22] Filed: Dec. 26, 1990

[51] Int. Cl.$^5$ ............................................. B23K 35/22
[52] U.S. Cl. ............................................. 219/146.21
[58] Field of Search ...... 219/146.21, 137 R, 137 WM

[56] References Cited

U.S. PATENT DOCUMENTS

| | | | |
|---|---|---|---|
| 2,952,573 | 9/1960 | Torti, Jr. | 219/146.21 |
| 3,054,166 | 9/1962 | Spendelow, Jr. et al. | 219/146.21 |
| 3,639,161 | 2/1972 | Trattner et al. | 219/146.21 |

FOREIGN PATENT DOCUMENTS

| | | | |
|---|---|---|---|
| 3711512 | 5/1960 | Japan | 219/146.21 |
| 265323 | 6/1970 | U.S.S.R. | 219/146.21 |

Primary Examiner—Clifford C. Shaw

Attorney, Agent, or Firm—Malin, Haley, McHale, DiMaggio & Crosby

[57] ABSTRACT

An improved welding electrode with a high current capacity that is non-consumable for use in gas tungsten arc welding and in plasma arc welding in which the electron emission capability of the electrode is increased and enhanced by the material composition of the electrode, and in particular of the emitter end. The emitter end consists of the use of tungsten carbide as a base metal for the activating elements thorium or zirconium. The invention also considers the use of refractory carbides such as tantalum carbide, zirconium carbide or molybdenum carbide in the emitter end. Also configurations are disclosed which permit the use of high electron emissions material with the shank portion of the electrode consisting of materials of high electrical and thermal conducting properties such as copper, molybdenum, or tungsten. The electrode provides for superior welding current for improving GTA or PA arc welding resulting in superior welding capability and controllability for welding processes.

7 Claims, 1 Drawing Sheet

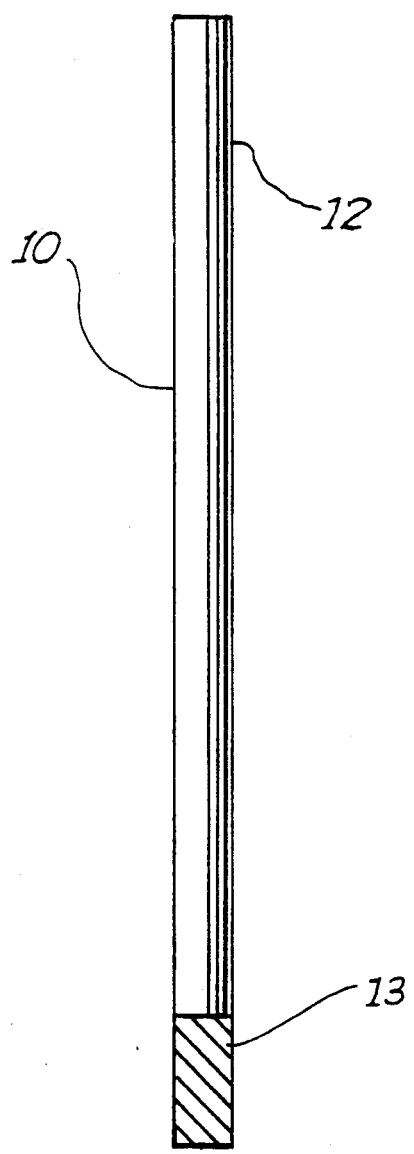

GAS TUNGSTEN AND PLASMA ARC WELDING ELECTRODE HAVING A CARBIDE EMITTER END

BACKGROUND OF THE INVENTION

1. Field of the Invention

This invention relates to the field of electrodes that are used in gas tungsten arc (GTA) welding and plasma arc (PA) welding, and in particular to an improved non-consumable welding electrode used primarily in gas tungsten arc and plasma arc welding which includes the use of improved chemical compositions of the electrode for improving the welding properties for superior welding capability and controllability in the welding processes.

2. Description of Related Art

Gas tungsten arc welding and plasma arc welding utilize an electrical arc to accomplish the welding processes. Typically in GTA or plasma arc welding the primary electrode consists of elemental tungsten usually with one to two percent thorium oxide or in an alternative embodiment 0.15%–0.40% zirconium oxide. Some of the objectives for the most efficient gas tungsten arc welding and plasma arc welding are to obtain high currents for increasing welding power for the particular sized welding electrode and voltage used, a stable arc, reliable starting of the arc, and cooling of the electrode because of the tremendous heat generated during the process. In pursuing these objectives various references have been shown in the prior art. U.S. Pat. No. 2,922,028 issued to Butler et al. Jan. 19, 1960 shows electric arc electrodes using 2% thoriated tungsten as an electrode. U.S. Pat. No. 3,198,932 issued to Wetherly, Aug. 3, 1965, discloses a plurality of insert tips useful in cutting with a reactive gas as the arc gas. U.S. Pat. No. 3,231,332, issued to Jones et al., Jan. 25, 1966, discloses use of an electrode having an outer layer consisting of pure tungsten or tungsten containing one or more additives such as alumina and potassium silicate. U.S. Pat. No. 3,976,853 issued to Trattner et al., issued Aug. 24, 1976, discloses an electrode having a tip bore filled with a powdered high melting electron emission material centered in situ.

The present invention has been determined to provide a welding electrode that has an electron emission capability superior to conventional GTA and PA thoriated tungsten and zirconated tungsten electrodes. In specific configurations provided in the present invention, the invention also possesses superior electrical and thermal conductivity properties. By providing an electrode having a lower thermionic work function as compared with prior art GTA and PA electrodes, the electrode in accordance with the present invention requires less energy to emit electrons resulting in higher welding efficiencies.

SUMMARY OF THE INVENTION

An improved non-consumable welding electrode for use in gas tungsten arc welding and plasma arc welding containing a shank portion consisting of conventional 1% or 2% thorium oxide, thoriated tungsten (AWS Classification EWTH1 or EWTH2) and a contiguous emitter end which is carburized over a selected length such as from $\frac{1}{4}"$ to $\frac{3}{4}"$ by heating the emitter end in a vacuum or reducing atmosphere to an appropriate high temperature in contact with a carbonaceous material such as graphite to form tungsten carbide preferably $W_2C$.

In an alternate embodiment the shank and contiguous emitter end of the electrode are comprised of a one-half percent zirconium oxide, zirconated tungsten (AWS Classification EWZr) with the emitter end being carburized over a selected length such as from $\frac{1}{4}"$ to $\frac{3}{4}"$ by heating the emitter end in a vacuum or reducing atmosphere to an appropriate high temperature in contact with a carbonaceous material such as graphite to form tungsten carbide, preferably $W_2C$. Optional matrix materials which may be used on the emitter end are tantalum carbide, zirconium carbide or molybdenum carbide.

During the gas tungsten arc welding process or the plasma arc welding process, when heating of the emitter end of the electrode in accordance with the invention occurs in the presence of the arc, the configuration at the emitter end of the electrode consists of a molecular layer of thorium or zirconium, depending on which dispersent is contained in the electrode on a surface consisting of tungsten carbide or an alternative refractory carbide if used. This configuration and structural composition is in contrast with that found in conventional GTA and PA electrodes wherein the molecular thorium or zirconium layers reside on elemental tungsten.

Use of carbides as described above provides an electrode which has a lower thermionic work function when compared with electrodes consisting of elemental tungsten as the base metal resulting in less energy to emit electrons. It is believed that there are indications that the absorption of the molecular layer of thorium is stronger when it resides on a substrate of tungsten or other refractory metal carbide than on a substrate of elemental tungsten resulting in resistance in the former case to dislodgement or stripping of the thorium monolayer by back bombarding ions from the GTA arc or plasma arc. When using an electrode in accordance with the present invention in GTA or PA welding, more abundant stable electron emission is obtained resulting in consistent, stable and more efficient welding as compared to welding results obtained with conventional uncarburized GTA and PA welding electrodes.

It is an object of this invention to provide an improved gas tungsten arc welding and plasma arc welding electrode to provide a higher current and therefore welding power than that presently available with the same size welding electrode and voltage applied.

It is another object of this invention to provide a welding electrode for GTA or plasma arc welding which provides a more stable arc than conventionally available electrodes.

Yet still another object of an embodiment of this invention is to provide a welding electrode in accordance with the invention in which the cooling of the electrode during the welding process can be significantly enhanced.

Yet still another object of this invention is to provide a GTA or plasma arc electrode for which easier and more reliable starting of the arc can be obtained.

In accordance with these and other objects which will be apparent hereinafter, the instant invention will now be described with particular reference to the accompanying drawings.

BRIEF DESCRIPTION OF THE DRAWING

The drawing shows an electrode in accordance with the present invention in a front elevational view partially in cross section.

PREFERRED EMBODIMENT OF THE INVENTION

Referring now to the drawing, a representative electrode suitable for gas tungsten arc welding or plasma arc welding is shown as an elongated cylindrically shaped rod generally at 10, the electrode having an upper shank portion 12 and a lower end portion 13 which represents the emitter end of the electrode where the welding arc is formed. The specific configuration and shape of the emitter end tip can have contours that provide desired arc shapes such as pointed arc or distributed arc functions. Of particular concern with the present invention is the composition of the electrode both in its shank portion and its emitter end portion.

In accordance with the present invention, the following examples are provided which incorporate embodiments of this invention.

EXAMPLE I

In accordance with the drawing, the shank portion of the electrode consists of a conventional 1% or 2% thorium oxide, 2 thoriated tungsten electrode (AWS Classification EWTH1 or EWTH2). The emitter end 13 of the electrode is contiguous with the shank portion and is carburized over a selected length for example from ¼" to ¾" by heating the emitter end in a vacuum or reducing atmosphere at an appropriate high temperature in contact with carbonaceous material such as graphite to form tungsten carbide preferably $W_2C$.

EXAMPLE II

Referring to the drawing, the shank portion of the electrode consists of a half percent zirconium oxide, zirconated tungsten electrode (AWS Classification EWZr) with the emitter end being contiguous with the shank portion and carburized as described in Example 1.

EXAMPLE III

In this embodiment, the welding rod shown in the drawing has a shank portion 12 consisting of copper or a commercially pure refractory metal such as molybdenum or tungsten which possess higher electrical and thermal conductivity properties than conventional GTA or PA electrode properties. The high electrical conductivity of the shank portion will reduce heating due to $I^2R$ losses which is particularly advantageous when employing the high current capability of an electrode in accordance with the invention. The high thermal conductivity of the shank material serves to efficiently conduct the heat which is generated along the length of the shank portion plus that which originates in the emitting end region to the typical or conventional water cooled collet of a GTA or PA welding torch resulting in minimal heating of the torch. In accordance with this example, the emitting end of the electrode consists of thoriated tungsten carbide or zirconated tungsten carbide as produced in Example I with the emitting end being metallurgically bonded to the shank portion.

EXAMPLE IV

In this example and referring to the drawing, the shank portion of the electrode consists of one of the shank metals described in Example III. The emitting end is metallurgically bonded to the shank portion of the electrode and consists of a pressed and sintered mixture of tungsten carbide and thorium oxide or zirconium oxide.

EXAMPLE V

In this example and referring to the drawing, the shank portion of the electrode consists of one of the metals as defined in Example III above. The emitting end is metallurgically bonded to the shank portion of the electrode and consists of a pressed and sintered mixture of tantalum carbide and thorium oxide or zirconium oxide.

EXAMPLE VI

In this example and referring to the drawing, the shank portion consists of one of the metals as defined in Example III above and the emitting end is metallurgically bonded to the shank portion and consists of a mixture of zirconium carbide and thorium oxide or zirconium oxide.

EXAMPLE VII

In this example the shank portion of the electrode as shown in the drawing consists of one of the metals as defined in Example III above and the emitting end of the electrode consists of a mixture of molybdenum carbide and thorium oxide or zirconium oxide.

Although in the description of the size of the emitter end the length of ¼" to ¾" has been provided, the size of the emitter end can be varied depending on the particular welding circumstances. Also the end tip can be of various configurations that are known in the art to produce a particular welding result in terms of the shape of the arc or the like.

The instant invention has been shown and described herein in what it is considered to be the most practical and preferred embodiment. It is recognized, however, that departures may be made therefrom within the scope of the invention and that obvious modifications will occur to a person skilled in the art.

What I claim is:

1. An electrode for gas tungsten arc welding or plasma arc welding, said electrode body comprising an elongated rod having a shank end, a shank portion and an emitter end metallurgically bonded to said shank portion, said electrode body composition consisting of:
   copper or a commercially pure refractory metal of high electrical conductivity and high thermal conductivity shank portion; and
   a carburized thoriated tungsten carbide or zirconated tungsten carbide emitter end.

2. An electrode for gas tungsten arc welding or plasma arc welding, said electrode body comprising an elongated rod having a shank end, a shank portion and an emitter end, said electrode body comprising:
   said shank portion composition consisting of a metal of high electrical and high thermal conductivity selected from the group of copper, molybdenum, or tungsten; and
   said emitter end consisting of a pressed and sintered mixture of tungsten carbide and thorium oxide or zirconium oxide, said emitter end being metallurgically bonded to the shank portion of the electrode body.

3. An electrode for gas tungsten arc welding or plasma arc welding, said electrode body comprising an elongated rod having a shank end, a shank portion and an emitter end metallurgically bonded to said shank portion, said electrode body comprising:
    said shank portion consisting of a high electrically conductive and thermally conductive metal selected from the group of copper, molybdenum, or tungsten; and
    said emitter end consisting of pressed and sintered mixture of tantalum carbide and thorium oxide or zirconium oxide.

4. An electrode for gas tungsten arc welding or plasma arc welding, said electrode body comprising an elongated rod having a shank end, a shank portion and an emitter end metallurgically bonded to said shank portion, said electrode body comprising:
    said shank portion consisting of a high electrically conductive and thermally conductive metal selected from the group of copper, molybdenum, or tungsten; and
    said emitter end consists of a mixture of zirconium carbide and thorium oxide or zirconium oxide.

5. An electrode for gas tungsten arc welding or plasma arc welding, said electrode body comprising an elongated rod having a shank end, a shank portion and an emitter end metallurgically bonded to said shank portion, said electrode body comprising:
    said shank portion consisting of a high electrically conductive and thermally conductive metal selected from the group of copper, molybdenum, or tungsten; and
    said emitter end is comprised of a mixture of molybdenum carbide and thorium oxide or zirconium oxide.

6. An electrode for gas tungsten arc (GTA) welding and plasma arc (PA) welding with the electrode having an emitter end consisting of a matrix of tungsten carbide and 1 to 2 percent of uniformly distributed thorium oxide or a matrix of tungsten carbide and up to 0.6 percent of uniformly distributed zirconium oxide.

7. An electrode for gas tungsten arc (GTA) welding and plasma arc (PA) welding with the electrode having an emitter end consisting of a matrix of tantalum carbide and one to two percent of uniformly distributed thorium oxide or a matrix of tantalum carbide and up to 0.6 percent of uniformly distributed zirconium oxide.

* * * * *